US 8,376,815 B1

(12) United States Patent
Parker

(10) Patent No.: US 8,376,815 B1
(45) Date of Patent: Feb. 19, 2013

(54) METHOD AND APPARATUS FOR ELECTRICAL STIMULATION OF MEAT

(75) Inventor: Tim Parker, Lewistown, NC (US)

(73) Assignee: Perdue Holdings, Inc., Wilmington, DE (US)

( * ) Notice: Subject to any disclaimer, the term of this patent is extended or adjusted under 35 U.S.C. 154(b) by 754 days.

(21) Appl. No.: 12/433,526

(22) Filed: Apr. 30, 2009

Related U.S. Application Data

(60) Provisional application No. 61/071,474, filed on Apr. 30, 2008.

(51) Int. Cl.
*A22C 17/00* (2006.01)
(52) U.S. Cl. ..................... 452/141
(58) Field of Classification Search ........... 452/141–145
See application file for complete search history.

(56) References Cited

U.S. PATENT DOCUMENTS

| | | | |
|---|---|---|---|
| 4,675,947 A * | 6/1987 | Clatfelter et al. ............ | 426/416 |
| 5,512,014 A | 4/1996 | Burnett | |
| 5,888,132 A | 3/1999 | Burnett | |
| 5,899,802 A | 5/1999 | Burnett | |
| 7,249,998 B2 | 7/2007 | van Esbroeck et al. | |
| 7,386,679 B2 * | 6/2008 | Franaszek et al. ............ | 711/145 |
| 2007/0207716 A1 | 9/2007 | van Esbroeck et al. | |
| 2007/0275645 A1 | 11/2007 | van Esbroeck et al. | |
| 2008/0233853 A1 * | 9/2008 | Higuchi et al. ............... | 452/141 |

OTHER PUBLICATIONS

Young et al., Effect of Polyphosphate Treatment and Electrical Stimulation on Postchill Changes in Quality of Broiler Breast Meat, 1999 Poultry Science, pp. 267-271.

Zocchi et al., Tenderness of Broiler Breast Fillets from Carcasses Treated with Electrical Stimulation and Extended Chilling Times, 1999 Poultry Science, pp. 495-498.
Lyon et al., Sensory Differences in Broiler Breast Meat Due to Electrical Stimulation, Deboning Time, and Marination, 2000 J. Appl. Poultry Res., pp. 234-241.
Sams, Alan R., Poultry Meat Processing, 2001, pp. 97-120.
Dickens et al., The Effects of Electrical Stimulation During Bleeding on Shear Values and Cook Loss of Breast Fillets From Mature Chickens Deboned At Two or Twenty-Four Hours Post-Evisceration, 2002 J. Appl. Poult. Res., pp. 111-115.
Lyon et al., Effects of Electrical Stimulation and Postchill Deboning time on Texture and Cook Loss of Broiler Breasts Processed Under Commercial Conditions, 2002 J. Appl. Poult., pp. 217-222.
Lyon et al., Effect of Postchill Deboning Time on the Texture Profile of Broiler Breeder Hen Breast Meat, 2003 J. Appl. Poult. Res., pp. 348-355.
Sams et al., Research Note: Anatomical Location of Application Influences the Tenderizing Effectiveness of Electrical Stimulation of Broiler Carcasses, 1992 Poultry Science, pp. 1564-1567.
Sams et al., Tenderness and R-Value Changes in Early Harvested Broiler Breast Tissue Following Post-Mortem Electrical Stimulation, 1989 Poultry Science, pp. 1232-1235.
Castaneda et al., Research Note: Functionality of Electrically Stimulated Broiler Breast Meat, 2005 Poultry Science, pp. 479-481.
Skarovsky et al., Tenderness, Moisture Loss and Post-Mortem Metabolism of Broiler Pectoralis Muscle From Electrically Stimulated and Air Chilled Carcases, 1999 British Poultry Science, pp. 622-624.

(Continued)

*Primary Examiner* — Richard Price, Jr.
(74) *Attorney, Agent, or Firm* — Venable LLP; Steven J. Schwartz

(57) ABSTRACT

A method of tenderizing meat on a poultry carcass includes defeathering the poultry carcass, and subsequently applying a pulsed electrical voltage across the poultry carcass. The electrical voltage can be sufficient to impart an electrical current across the poultry carcass that is at least about 350 milliamps. An apparatus for tenderizing meat on a poultry carcass is also discussed.

20 Claims, 3 Drawing Sheets

OTHER PUBLICATIONS

Sams, A., Post-Mortem Electrical Stimulation of Broilers, Jun. 2002, World's Poultry Science Journal, vol. 58, pp. 147-157.
Kranen, R.W., Rapid Rigor: The Way to Accelerate In-Line Poultry Processing, pp. 379-384.
Li et al., Electrical Stimulation in Poultry: A Review and Evaluation, 1993 Poultry Science, pp. 7-22.
Sams, A.R., Electrical Stimulation and High Temperature Conditioning of Broiler Carcasses, 1990 Poultry Science, pp. 1781-1786.
Lyon et al., Research Note: Effects of Wing Restraints on the Objective Texture of Commercially Processed Broiler Breast Meat, 1992 Poultry Science, pp. 1228-1231.
Lyon et al., Effects of a Physical Treatment Applied Immediately After Chilling on the Structure of Muscle Fiber and the Texture of Cooked Broiler Breast Meat, 1992 Applied Poultry Science, Inc., pp. 300-303.
Forsythe, Richard, Tenderness Without Aging Using Electrical Stimulation, Poultry, p. 16.
Birkhold et al., Fragmentation, Tenderness and Post-Mortem Metabolism of Early-Harvested Broiler Breast Fillets from Carcasses Treated with Electrical Stimulation and Muscle Tensioning, 1993 Poultry Science, pp. 577-582.
Lyon et al., Effects of Electric Treatments and Wing Restraints on the Rate of Post-Mortem Biochemical Changes and Objective Texture of Broiler Pectoralis Major Muscles Deboned After Chilling, 1993 Poultry Science, pp. 1577-1583.
Sams, A., Electrical Stimulation at Commercial Line Speeds, Dec. 1964 Broiler Industry, pp. 18, 19, 20, 22.
Dickens, J.A., The Effects of Electric Stimulation and Extended Chilling Times on the Biochemical Reactions and Texture of Cooked Broiler Breast Meat, 1995 Poultry Science, pp. 2035-2039.
Sams, A., Electrical Stimulation At Commercial Line Speeds-An Update, Nov. 1995 Broiler Industry, pp. 20, 22, 23.
Craig et al., A Comparison of High Current and Low Voltage Electrical Stunning Systems on Broiler Breast Rigor Development and Meat Quality, 1997 Poultry Science, pp. 1178-1181.
Lyon et al., Effects of Chilling Time and Belt Flattening on Physical Characteristics, Yield, and Tenderness of Broiler Breasts, 1997 J. Appl. Poultry Res., pp. 39-47.
Sams, A., Commerical Implementation of Postmortem Electrical Stimulation, 1999 Poultry Science, pp. 290-294.
Sams, A.R., Meat Quality During Processing, 1999 Poultry Science, pp. 798-803.
Electrical Stimulation-Fundamentals and technological solutions, Stork Food Systems, 14 pages.
Young et al., Effects of Electrical Stimulation and Simulated Conventional-and Extended Chilling Method on Cooked Chicken Breast Meat Texture and Yield, 2005 International Journal of Poultry Science, pp. 60-63.

* cited by examiner

METHOD AND APPARATUS FOR ELECTRICAL STIMULATION OF MEAT

CROSS-REFERENCE TO RELATED APPLICATIONS

This application claims priority under 35 U.S.C. §119 of U.S. Provisional Application No. 61/071,474, filed Apr. 30, 2008, the entire content of which is expressly incorporated herein by reference.

TECHNICAL FIELD

This invention relates generally to tenderizing poultry or other meats. More particularly, this invention relates to a method and apparatus for tenderizing poultry or other meats through electrical stimulation.

BACKGROUND

Tenderness is a primary attribute of meat, such as poultry. Deboning muscles, which have not yet developed full rigor mortis, can cause them to contract and shorten, for example, due to energy left in the tissue. This can result in tough meat. Poultry, such as chicken, typically takes about six hours to develop full rigor mortis. However, in-line processing and portioning of poultry is a continuous process that typically permits deboning at approximately three hours post mortem—often well before rigor mortis has fully set in. Therefore, in order to preserve the full tenderness of the meat, avoid contamination of the meat, minimize process times, and obtain other benefits, it is desired to expedite the onset of full rigor mortis in the meat.

Rigor mortis is the process of cell death. When an animal dies, its individual cells remain alive, using the energy stored in them. At death, with the loss of blood that supplies oxygen to the cells, the cells gradually shift from oxygen dependant (aerobic) metabolism to oxygen independent (anaerobic) metabolism. The cells continue to use energy, but make it more slowly because oxygen independent metabolism is less efficient than oxygen dependant metabolism.

This imbalance of energy production causes the cells primary energy compound, adenosine triphosphate (ATP), to decrease. The result of this metabolism causes the metabolite lactic acid to accumulate. In living animals, lactic acid would be removed by the blood supply. In a dead animal lactic acid accumulates in the muscle. This accumulation of lactic acid causes the pH of the muscle to drop from neutral (7) to about 5.7. At a pH of 5.9 the muscle is in the beginning stages of rigor. This drop in the pH results in further ATP reduction.

ATP has several functions in the muscle. One function is to regulate the interactions of the protein fibers involved in contracting muscle fiber, and in relaxing the muscle fiber back to the original length. When ATP is depleted, the muscle is in rigor mortis. When ATP is reduced, the muscle can no longer relax, or become tender.

Keeping the bone or skeletal structure in tact until rigor mortis is reached prevents the muscle fiber from contracting to a level that would cause toughness. However, cutting and deboning the muscle before rigor mortis is developed will cause a nervous signal in the muscle and cause it to contract more. A more contracted muscle is tougher, for example, because it is thicker.

SUMMARY

This patent application relates to a method and apparatus that accelerates the onset of full rigor mortis in meat, particularly poultry, using electrical stimulation.

According to an illustrative embodiment, a method of tenderizing meat on a poultry carcass comprises defeathering the poultry carcass, and subsequently applying a pulsed electrical voltage across the poultry carcass, wherein the electrical voltage is sufficient to impart an electrical current across the poultry carcass that is at least about 350 milliamps.

According to another illustrative embodiment, an apparatus for tenderizing meat on a poultry carcass comprises a conveyor adapted to transport at least one poultry carcass along a processing path, a defeathering station located along the processing path, and an electrical stimulator located along the processing path downstream of the defeathering station. The electrical stimulator can comprise at least a first conductor adapted to contact the poultry carcass, and a voltage generator connected to the first conductor, the voltage generator adapted to generate a pulsed voltage through the poultry carcass when the poultry carcass is in contact with the first conductor, wherein the voltage is sufficient to impart an electrical current across the poultry carcass that is at least about 350 milliamps.

Further objectives and advantages, as well as the structure and function of preferred embodiments, will become apparent from a consideration of the description, drawings, and examples.

BRIEF DESCRIPTION OF THE DRAWINGS

The foregoing and other features and advantages of the invention will be apparent from the following, more particular description, as illustrated in the accompanying drawings wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. While specific embodiments are discussed, it should be understood that this is done for illustration purposes only. A person skilled in the relevant art will recognize that other components and configurations can be used without departing from the spirit and scope of the invention.

Pre and/or postmortem electrical stimulation can prevent some toughness in meat and also provide some tenderization. Electrical stimulation is the sending of electricity through recently slaughtered meat, such as poultry or, more specifically, chickens. The electricity enters through the head or breast while the slaughtered meat is still on the shackle and exits where the feet or top of the shackle are grounded.

During a post-pick electrical stimulation process using pulsed AC current according to an illustrative embodiment of the present invention, it is believed that there are two differing and simultaneous results contributing to preventing toughness and/or providing tenderization: (1) The electrical current exercises or contracts the muscle, accelerating the depletion of ATP and developing rigor mortis earlier. Depletion of ATP happens simultaneously with pH reduction. (2) The pulse or electrical current causes such a forceful contraction of the muscle that the muscle fibers, or sarcomere, are torn (on a cellular level, typically not visible) reducing the integrity of the protein network responsible for toughness of the muscle. It is believed that this effect is present when multiple pulses are applied.

Figure 1:
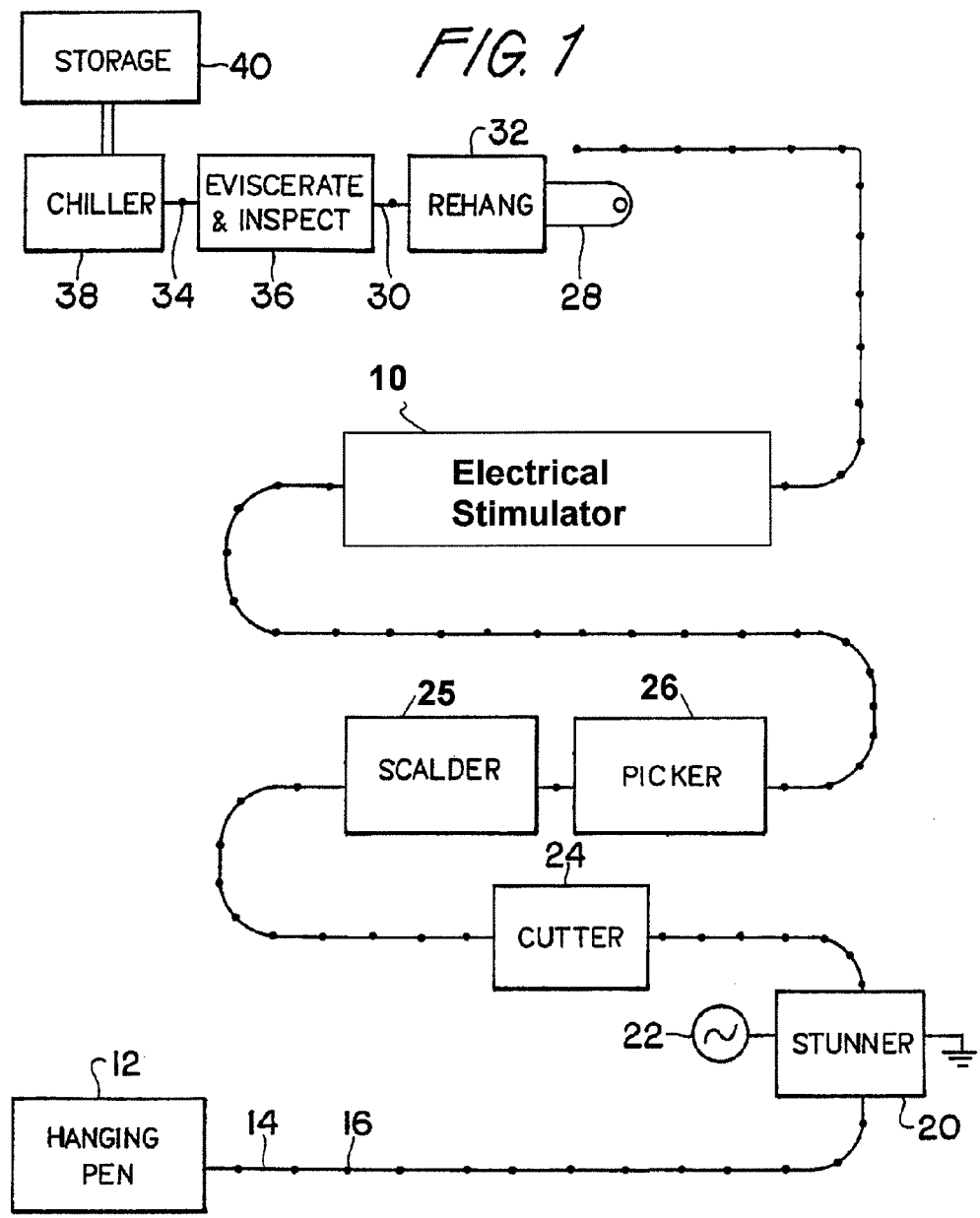
FIG. 1 is a schematic representation of an illustrative method of processing poultry according to the present invention.

Referring to FIG. 1, the processing steps of an illustrative poultry processing line 14, including an electrical stimulator 10 according to the present invention, are shown. Poultry, such as chickens or turkeys, may be transported to a hanging pen 12 where they can be suspended from a moving processing line 14 by suitable support or suspension devices, such as shackles 16. According to an illustrative embodiment, the shackles 16 are spaced six inches apart, and the processing line 14 travels at about seventy feet per minute, yielding a capacity of about 140 birds per minute, however, other configurations are possible. Although illustrative embodiments are described herein with respect to poultry, and particularly chicken, the process and related apparatus are not limited to use with poultry or chicken, and can be used with other types of meat.

Chickens suspended from the processing line 14 can be transported to a stunner 20, which electrically stuns the chickens to render them unconscious for slaughter. According to an illustrative embodiment, the stunner uses a twenty five volt AC stunning voltage generated by a conventional AC voltage source 22, however other configurations and methods for stunning, such as exposure to carbon dioxide, are possible. Also, stunning can take place prior to suspending on a support device.

The processing line 14 can then carry the chickens to a cutter 24, which kills the chickens, for example, by cutting their throats. Following the cutter 24, the processing line 14 can transport the chicken carcasses to a scalder 25, which can scald the carcasses with hot water to ease removal of the feathers from the carcasses at the downstream defeathering station, also known as a picker 26. Downstream from the scalder 25 and the picker 26, the processing line 14 can transport the carcasses to an electrical stimulator 10, which may electrically stimulate the carcasses with a pulsed electrical voltage at high-amperage for a predetermined cycle, to tenderize the meat, as will be described in more detail below.

From the electrical stimulator 10, the processing line can transport the processed carcasses to a conveyor belt 28, onto which the carcasses can be dropped for rehanging onto a second "clean" processing line 30 at a rehanging station 32. The second processing line 30 may have support or suspension devices 34 from which the chicken carcasses can be suspended. The suspended chicken carcasses can be transported through an evisceration process 36 where the carcasses are eviscerated and/or inspected by an authorized USDA inspector. The eviscerated and inspected carcasses can then be transported by the second processing line 30 to a chiller, for example, a cold-water chiller 38, where the processed carcasses are chilled prior to storage in a storage area 40.

In illustrative embodiments, the poultry can be deboned without significant aging after electrical stimulation. In other embodiments, some aging period can be utilized. Aging typically involves leaving the meat on the bone for some period of time before deboning. Aging can be used to further promote tenderness, but satisfactory results can be obtained without aging and aging is not required to practice the present invention. When used, aging is usually conducted during the chilling process. In illustrative embodiments for practicing the invention, aging can be less than two hours, for example less than one hour.

Figure 2:
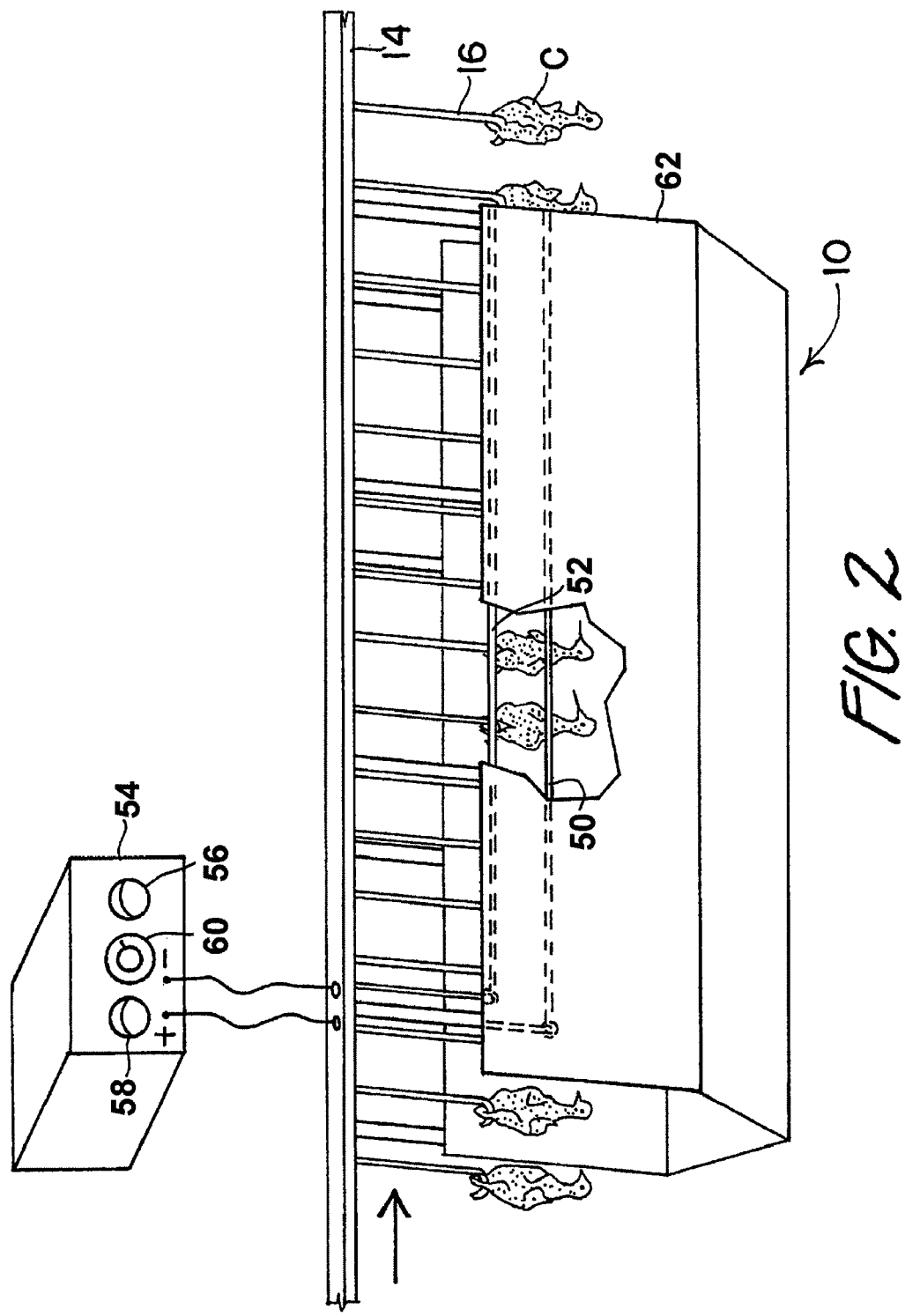
FIG. 2 is a perspective, partially cut-away view of an illustrative electrical stimulator according to the present invention.

Referring to FIG. 2, an illustrative electrical stimulator 10 according to the present invention is shown. As shown, the electrical stimulator 10 can comprise one or more conductors arranged to contact the carcass C as it is transported along the processing line 14. For example, the stimulator 10 can include a first conductor or electrode bar 50, and a second conductor or ground bar 52. As shown, the electrode bar 50 and ground bar 52 can comprise round, conductive rods (e.g., made of stainless steel or other metal) extending along the processing line 14. According to an illustrative embodiment, the first conductor 50 can be positioned to contact carcasses proximate the head-neck junction near the meaty portion of the breast, or mid-breast at the top of the keel, and the second conductor 52 can be located above the first conductor 50 and in contact with the carcasses C, or in contact with the shackles 16. Alternatively, the first conductor 50 and second conductor 52 can be located on opposed sides of the carcasses C, such that the carcasses C move between, and in contact with, both the first conductor 50 and the second conductor 52 during processing. According to an alternative embodiment, a conductor can be located on the shackle 16 and in contact with the carcass, for example, at the feet or legs, and another conductor or ground bar can comprise a rod (similar to rods 50, 52), conductive plate (not shown), conductive bath (not shown), or other conductive medium that contacts the head or other similarly situated part of the carcass. In an illustrative embodiment, the electrode bar 50 and ground bar 52 can be arranged such that a significant current is received across the breast of the carcass C. This can assure that significant tenderization occurs in the more commercially important portion of the final product.

The electrical stimulator 10 can further comprise a voltage generator 54, for example, connected to the first and second conductors 50, 52. The first conductor (electrode bar) 50 can be conducted to the hot terminal of the generator 54, and the second conductor (ground bar) 52 can be conducted to the ground terminal, or vice versa. According to an illustrative embodiment, the voltage generator 54 can generate a pulsed voltage between the first and second conductors 50, 52, and through each carcass C that is in contact with the conductors 50, 52. According to an illustrative embodiment, the voltage generator 54 can include a volt meter 56 for monitoring the voltage, an ammeter 58 for monitoring current, and a rheostat 60 for varying the voltage. According to an illustrative embodiment, one or more safety panels, such as a Plexiglass® shield 62, can be located around all or a portion of the electrical stimulator 10. All or a portion of the safety panels can be transparent or translucent to improve observation of the operating parameters of the electrical stimulation process.

In order to reduce the aging period for the poultry meat, and/or to tenderize the poultry meat, the voltage generator 54 can be operated to electrically stimulate each of the carcasses C. According to an illustrative embodiment, the voltage generator 54 can be operated to provide a pulsed electrical voltage through each of the carcasses C. According to an illustrative embodiment, the pulsed electrical voltage is sufficient to generate a high AC current through each of the carcasses C, for example, an AC current of approximately 350 milliamps or more. According to an illustrative embodiment, the pulsed electrical voltage is sufficient to generate an electrical current through each of the carcasses C ranging from about 350 milliamps to about 700 milliamps, for example, about 450 milliamps.

According to an illustrative embodiment, the Amps/carcass can be calculated by dividing the total number of amps between the conductors 50, 52 by the number of carcasses in contact with the conductors 50, 52 at that time. According to an illustrative embodiment, about 20-60 carcasses may be in contact with the conductors 50, 52 at the same time, for example, about 23-58 carcasses, or about 46 carcasses. To obtain the amperages/carcass values according to the invention, the voltage generator 54 may need to generate an amperage between the conductors 50, 52 in the range of about 14-31 Amps, for example, between about 18-21 Amps, between about 23-26 Amps, or between about 26-31 Amps, however other amperages or ranges of amperages are possible.

In some illustrative embodiments, the voltage, current, and/or number of carcasses stimulated can be controlled by an automated system. The automated system can adjust, for example, the voltage, current, and/or number of carcasses in contact, or rate of carcass movement in order to obtain a desired current through each carcass. In this way, an approximately constant current per carcass can be maintained.

According to an illustrative embodiment, the voltage generator 54 can generate a pulsed electrical voltage in the range of about 200 volts AC to about 450 volts AC, or higher, however other voltages or voltage ranges are possible. Illustrative voltages or voltage ranges include, for example: about 210-265 V; about 240-280 V; about 250-260 V; about 270-310 V; or about 300 V.

Several factors may affect the value of the current generated across each carcass C, such as, for example: the value of the voltage applied to the carcasses C; the resistance of each carcass C; and the number of carcasses C in contact with both conductors 50, 52 (more carcasses typically equals less resistance). The rate at which the carcasses C are moving on the processing line 14 may have some influence on current across each carcass C; for example, in some circumstances, faster speeds can equal less resistance, however, this is not always the case. A typical, bled broiler carcass typically exhibits a resistance from about 1,000 Ohms to about 1,500 Ohms, with the resistance typically decreasing as the bird size increases.

The voltage generator 54 can be controlled to provide the desired high current (e.g., 350 milliamps or more) through each carcass C based on a combination of some or all of the factors listed above. For example, the voltage generator 54 can consider some or all of the factors listed above, and adjust its output voltage to provide the desired high current, using, for example, the equation $V=I*R$, where V represents the necessary voltage, I represents the desired current, and R represents the resistance. According to an illustrative embodiment, the voltage generator 54 can make these calculations and adjustments automatically and in real time, for example, using a microprocessor or similar computer device. According to another illustrative embodiment, a human operator can operate the voltage generator 54 manually to provide the desired high current, for example, by reading an amperage reading for the processing line 14, dividing the amperage reading by the number of carcasses C on the processing line 14, and adjusting the current accordingly. According to another illustrative embodiment, the generator 54 can operate semi-automatically to achieve the desired current, for example, by a combination of human and computer control.

Imparting a pulsed high AC current across the carcasses after defeathering, for example about 350 milliamps or more, can provide certain advantages over the prior art. For example, it has been found that the pulsed high AC current can provide similar or better results than prior art "low amperage" processes, while shortening process times. In addition, the use of pulsed high AC current may cause tearing of at least some of the muscle tissue in the carcasses, which is believed to increase the tenderness of the meat to the consumer as compared to low amperage stimulation. This increase in tenderness has been determined through laboratory testing, for example, using single-blade and multi-blade shear cell testing with an Instron® machine, and through taste testing, for example, by trained testers as well as random consumers. The use of pulsed high AC current after the picking process can also drastically reduce, or even eliminate, the post-processing cooling or aging period. It is often necessary to have an aging period of two hours or more in order to obtain satisfactory tenderness levels with prior art low amperage techniques. In fact, low amperage stimulation may be unable to obtain acceptable levels of tenderness in the final product, as determined by subjective and/or objective testing.

The use of high AC current may shorten the length of the electrical stimulation process along the processing line, for example, to less than twenty five feet in length, as compared to some prior art electrical stimulation processes that require a processing line length of greater than 100 feet. This reduction in length can save valuable real estate, and can also reduce the time required for the electrical stimulation processing step, for example, from around ninety seconds to less than twenty five seconds (e.g., about twenty one seconds according to an illustrative embodiment).

According to an illustrative embodiment, the voltage generator 54 can apply the voltage in multiple cycles, wherein each cycle may comprise a pulse (e.g., a period when the voltage is turned on), followed by a rest period (e.g., a period when the voltage is reduced or turned off). According to an illustrative embodiment, the voltage can be applied to each carcass C in five or more cycles. In general, the pulse can be from about 0.1 to about 8 seconds, and the rest period can be from about 0.1 to about 1 seconds. According to an illustrative embodiment, the voltage can be applied to each carcass C in seven cycles, wherein each pulse lasts about two seconds, and each rest period lasts about one second. According to another illustrative embodiment, the voltage can be applied to each carcass C in 10.5 cycles (i.e., eleven pulses and ten rest periods), wherein each pulse lasts about one second, and each rest period lasts about one second. Other illustrative on/off cycles can include, for example: 0.1 seconds on/0.1 seconds off; 0.6 seconds on/0.6 seconds off; 0.7 seconds on/0.3 seconds off; 0.8 seconds on/0.4 seconds off; and 8 seconds on/1 second off. One of ordinary skill in the art will appreciate that other types, lengths, number, and durations of voltage cycles are possible to obtain a high amperage electrical stimulation. Various combinations can be determined that provide the desired tenderness.

According to another illustrative embodiment, the post-pick electrical stimulator 10 can provide constant voltage to each carcass C, for example, by setting the rest period to zero seconds in length.

In typical application of electricity during processing, only about 60% of the muscle sarcomeres contract at one time. Pulsing several times can contract and/or tear more sarcomeres resulting in less tough or more tender muscles. In an illustrative embodiment, pulsing five to seven times at two seconds on and one second off has been found to give satisfactory results, although at least five pulses should be obtained. Because maintaining contact of conductors with the breast when the current is on can be difficult, seven pulses can be applied to assure all breast on a processing line receive 2 seconds of current at least 5 times. As stated above, satisfactory results can also be obtained when about ten to eleven pulses of current, each with a duration of about one second, are applied However, it has been determined that there is no detrimental results from extra pulses.

Figure 3:
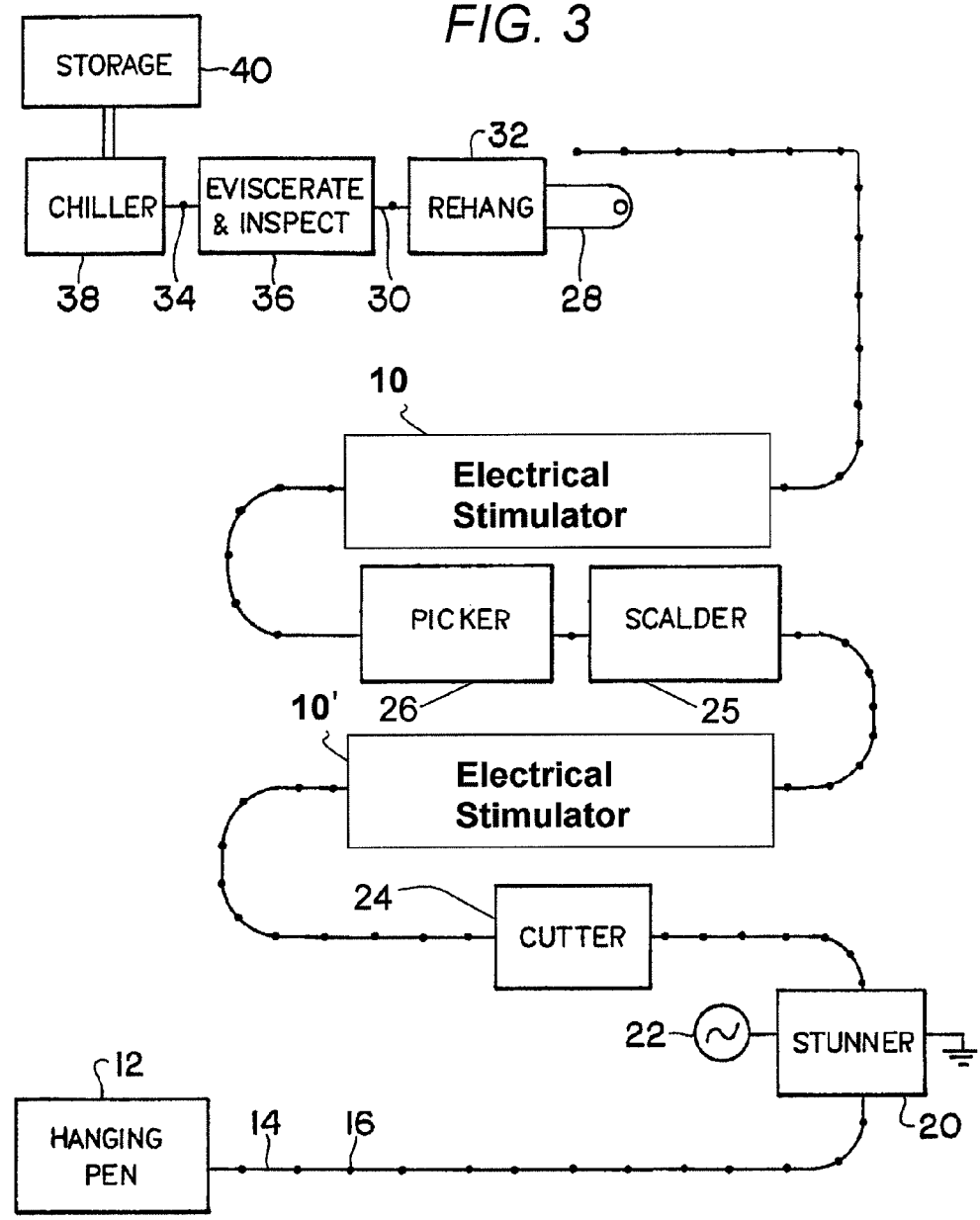
FIG. 3 is a schematic representation of an alternative embodiment of the illustrative method of FIG. 1.

According to an alternative embodiment shown in FIG. 3, the processing line 14 can also transport the carcasses to a second electrical stimulator 10' located upstream of the scalder 25 and/or picker 26. For example, the second electrical stimulator 10' can be located immediately upstream of the scalder 25 and/or picker, or alternatively, the second electrical stimulator 10' can be located even further upstream, e.g., prior to the cutter 24 and/or stunner 22. The second electrical stimulator 10' may be similar in construction to the first electrical stimulator 10, and may electrically stimulate the carcasses with a constant or pulsed electrical voltage to tenderize the meat, as will be described in more detail below. According to an illustrative embodiment, the upstream (second) electrical stimulator 10' can electrically stimulate the carcasses with a constant electrical voltage, and the downstream electrical stimulator 10 can electrically stimulate the carcasses with a pulsed electrical voltage.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A method of tenderizing meat on a poultry carcass, comprising:
    defeathering the poultry carcass; and
    subsequently applying a pulsed electrical voltage across the poultry carcass, wherein the pulsed electrical voltage is sufficient to impart an electrical current across the poultry carcass that is at least about 350 milliamps.

2. The method of claim 1, further comprising:
    applying a constant or pulsed electrical voltage across the poultry carcass prior to defeathering the poultry carcass.

3. The method of claim 1, wherein the pulsed electrical voltage imparts an electrical current across the poultry carcass ranging from about 350 milliamps to about 450 milliamps.

4. The method of claim 1, wherein the pulsed electrical voltage is greater than about 200 volts AC.

5. The method of claim 1, wherein the pulsed electrical voltage is applied in at least five pulses.

6. The method of claim 5, wherein each pulse lasts between about 0.6 seconds and about 1 seconds.

7. The method of claim 6, wherein each pulse is separated from a subsequent pulse by a rest period of between about 0.3 seconds and about 1 seconds.

8. The method of claim 5, wherein each pulse is about one second long.

9. The method of claim 8, wherein each pulse is separated from a subsequent pulse by a rest period of about one second.

10. The method of claim 1, wherein the pulsed electrical voltage imparts tearing to at least some muscle tissue on the poultry carcass.

11. The method of claim 10, wherein the tearing is on a cellular level only.

12. The method of claim 1, wherein the step of applying a pulsed electrical voltage across the poultry carcass lasts less than about 21 seconds.

13. The method of claim 1, wherein the pulsed electrical voltage is between about 14 Amps and about 31 Amps.

14. An apparatus for tenderizing meat on a poultry carcass, comprising:
    a conveyor adapted to transport at least one poultry carcass along a processing path;
    a defeathering station located along the processing path; and
    an electrical stimulator located along the processing path downstream of the defeathering station, the electrical stimulator comprising:
        at least a first conductor adapted to contact the poultry carcass; and
        a voltage generator connected to the first conductor, the voltage generator adapted to generate a pulsed voltage through the poultry carcass when the poultry carcass is in contact with the first conductor, wherein the voltage is sufficient to impart an electrical current across the poultry carcass that is at least about 350 milliamps.

15. The apparatus of claim 14, further comprising:
    a second electrical stimulator located along the processing path upstream of the defeathering station.

16. The apparatus of claim 15, wherein the second electrical stimulator is adapted to generate a constant or pulsed voltage through the poultry carcass.

17. The apparatus of claim 14, wherein the first voltage generator is adapted to generate a pulsed voltage that imparts an electrical current across the poultry carcass ranging from about 400 milliamps to about 450 milliamps.

18. The apparatus of claim 14, wherein the first voltage generator is adapted to generate a pulsed voltage of at least about 200 volts AC.

19. The apparatus of claim 14, wherein the first conductor comprises a round rod extending along the processing path.

20. The apparatus of claim 14, wherein the electrical stimulator occupies less than about 25 feet of length of the conveyor.

* * * * *